May 17, 1955      D. W. MOLINS ET AL      2,708,391
LOADING APPARATUS FOR ORDNANCE

Filed Sept. 26, 1951      12 Sheets-Sheet 1

INVENTORS
D. W. Molins,
J. C. Haysom & J. A. Mason
By Watson, Cole, Grindle & Watson

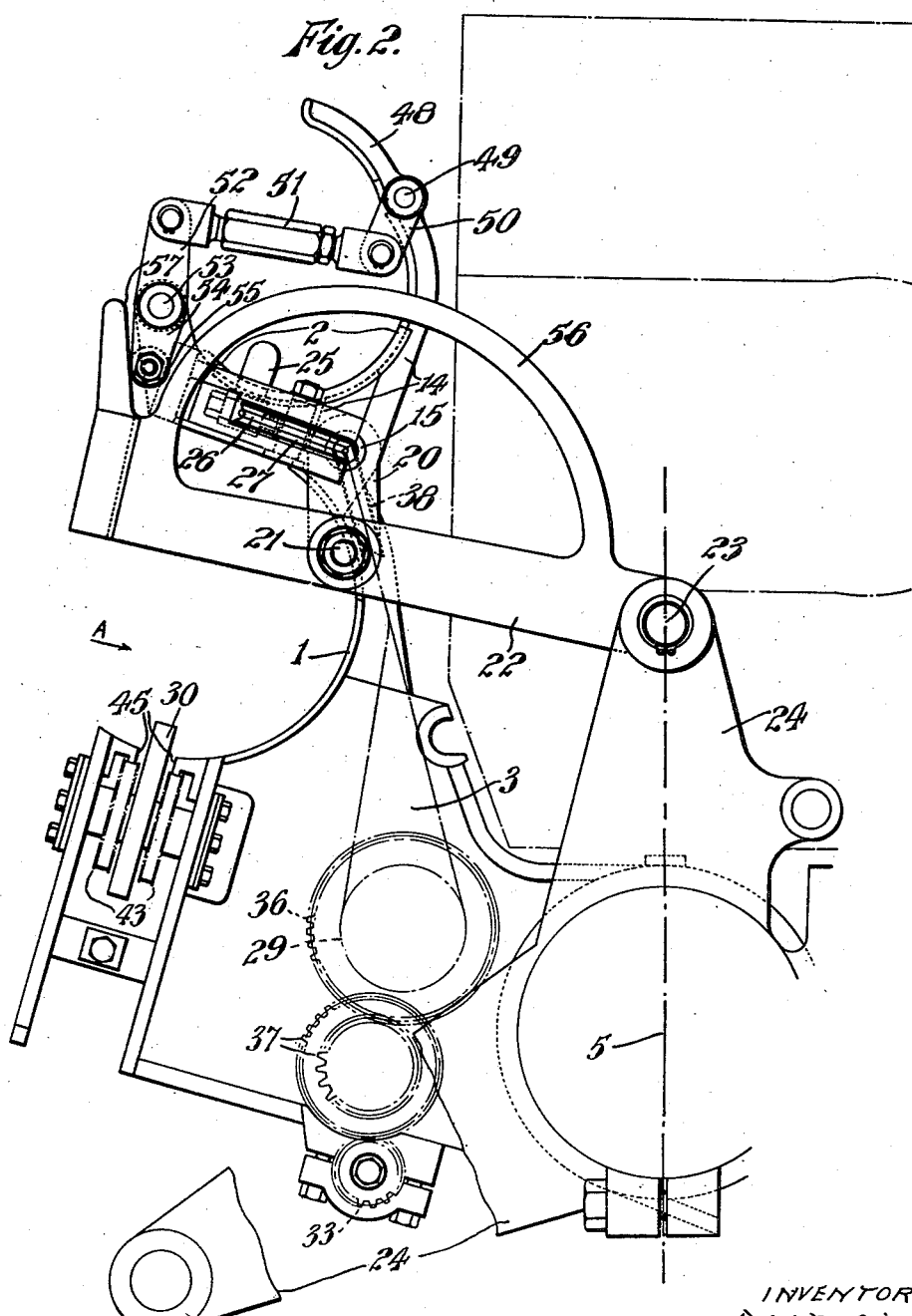

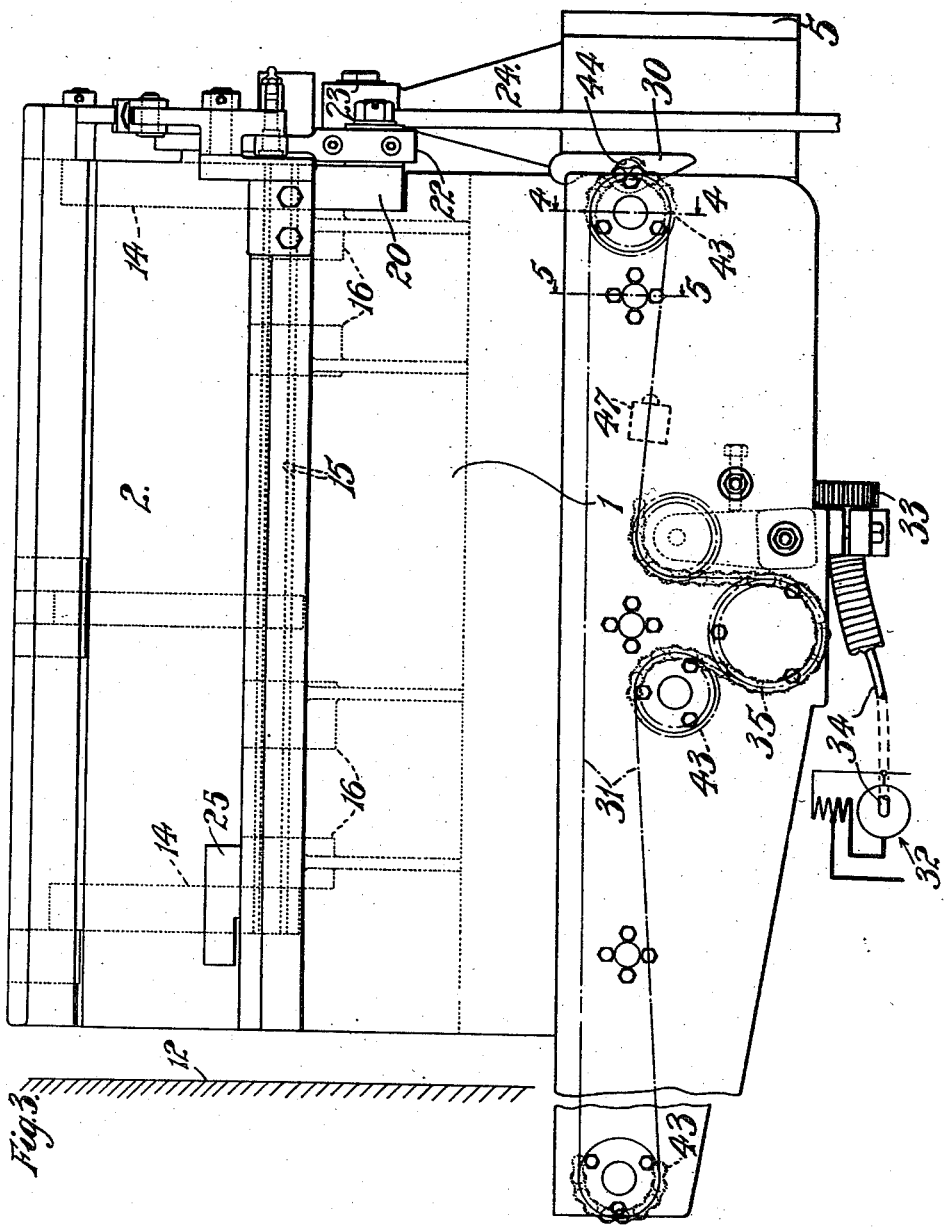

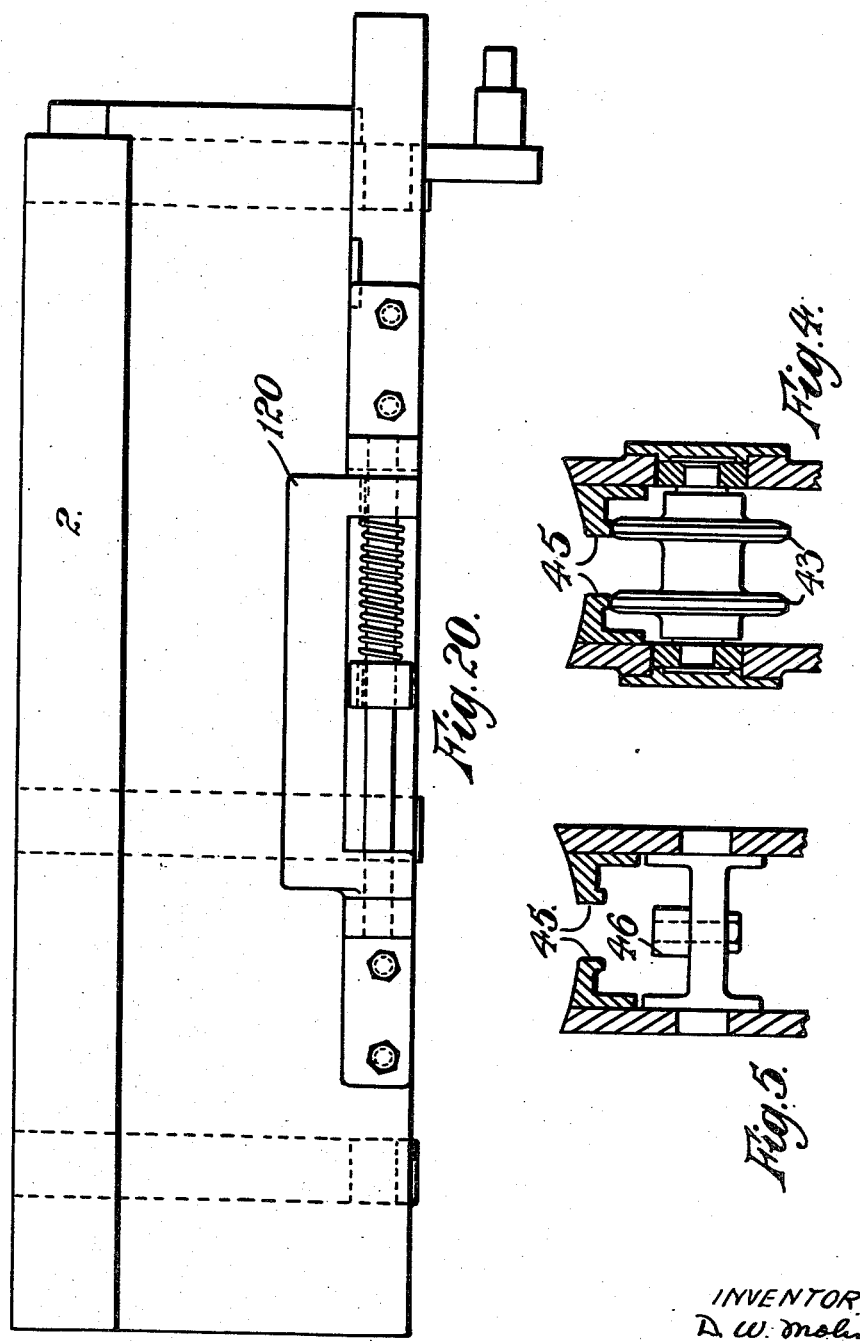

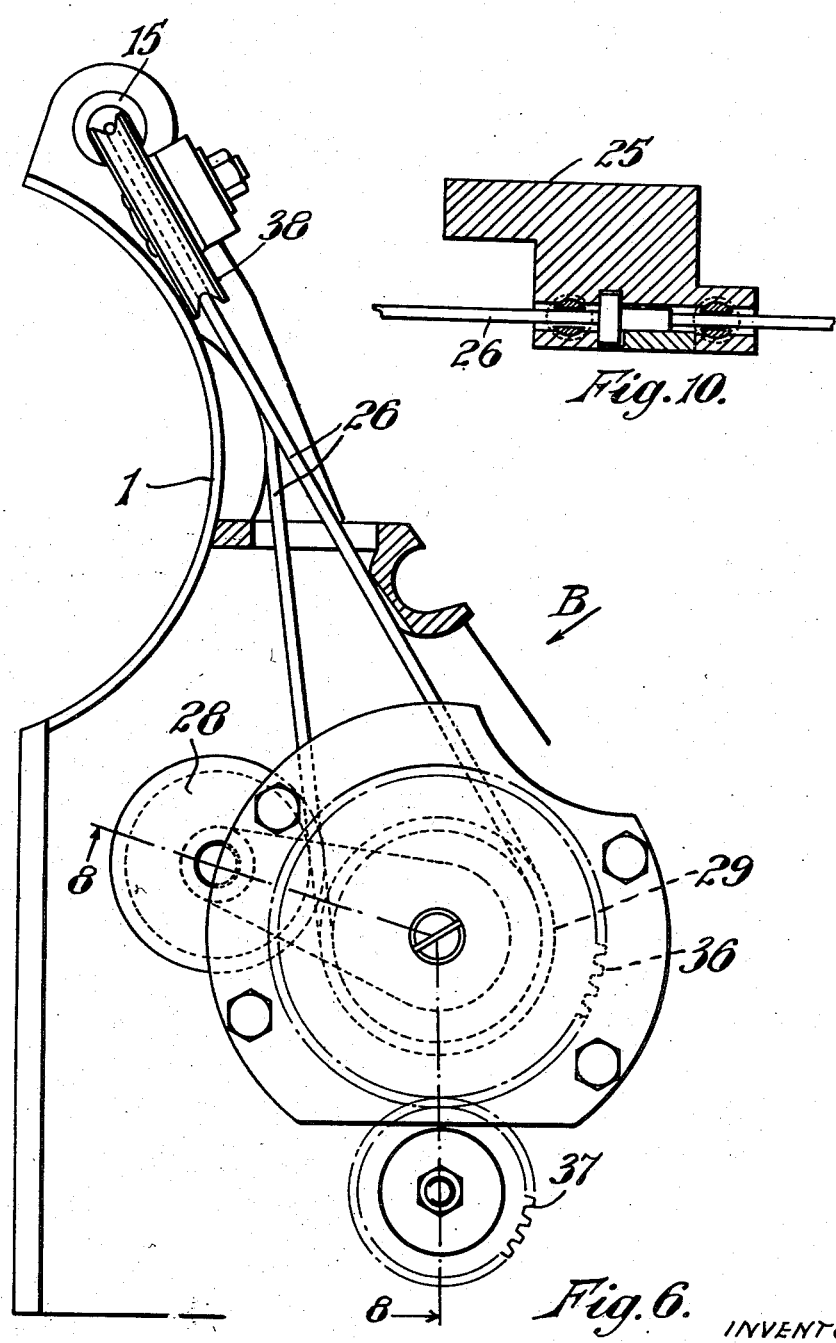

May 17, 1955  D. W. MOLINS ET AL  2,708,391
LOADING APPARATUS FOR ORDNANCE
Filed Sept. 26, 1951  12 Sheets-Sheet 6

INVENTORS
D. W. Molins,
J. C. Haysom & J. A. Mason
By Watson, Cole, Grindle & Watson

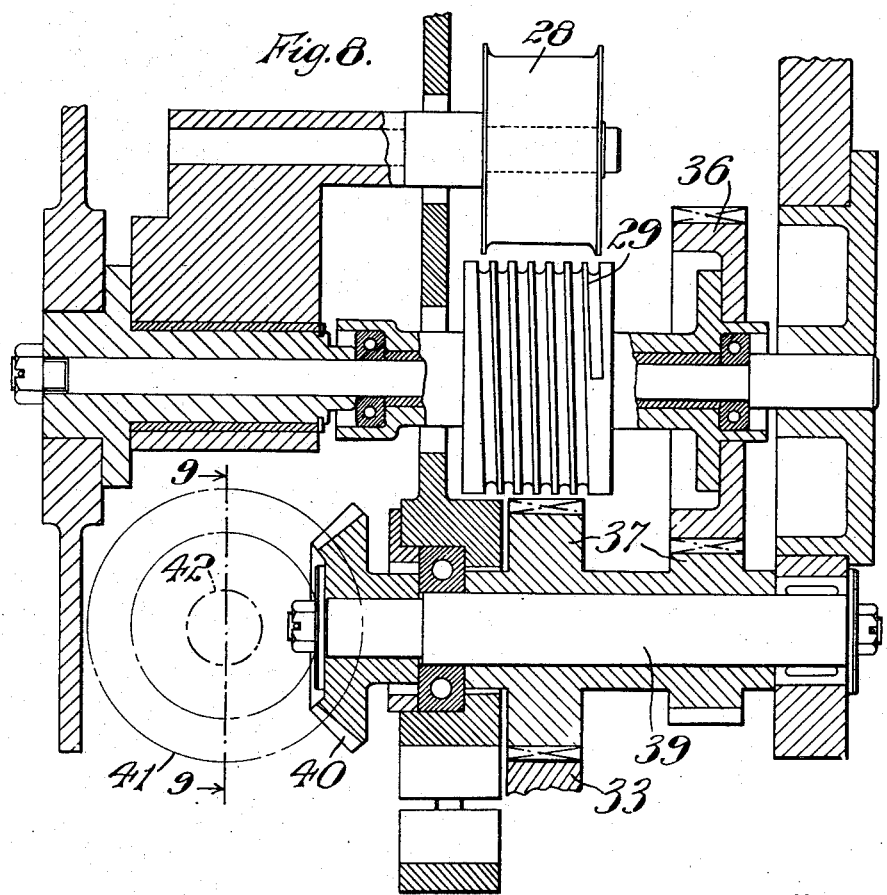
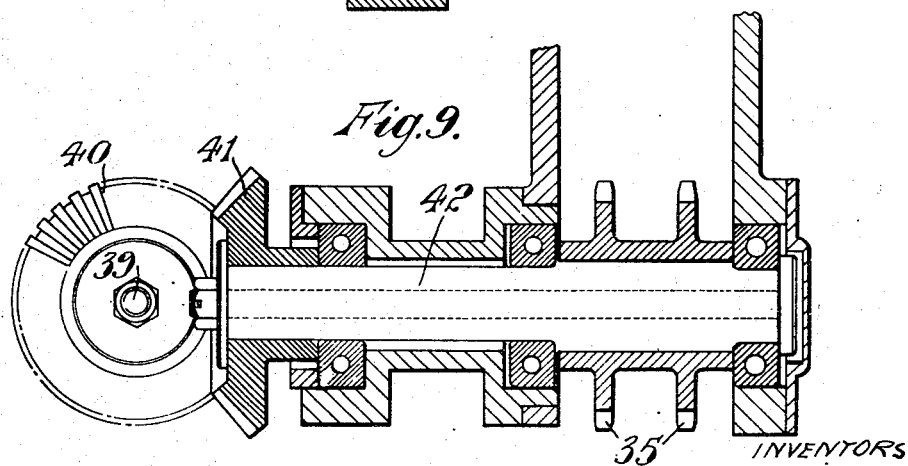

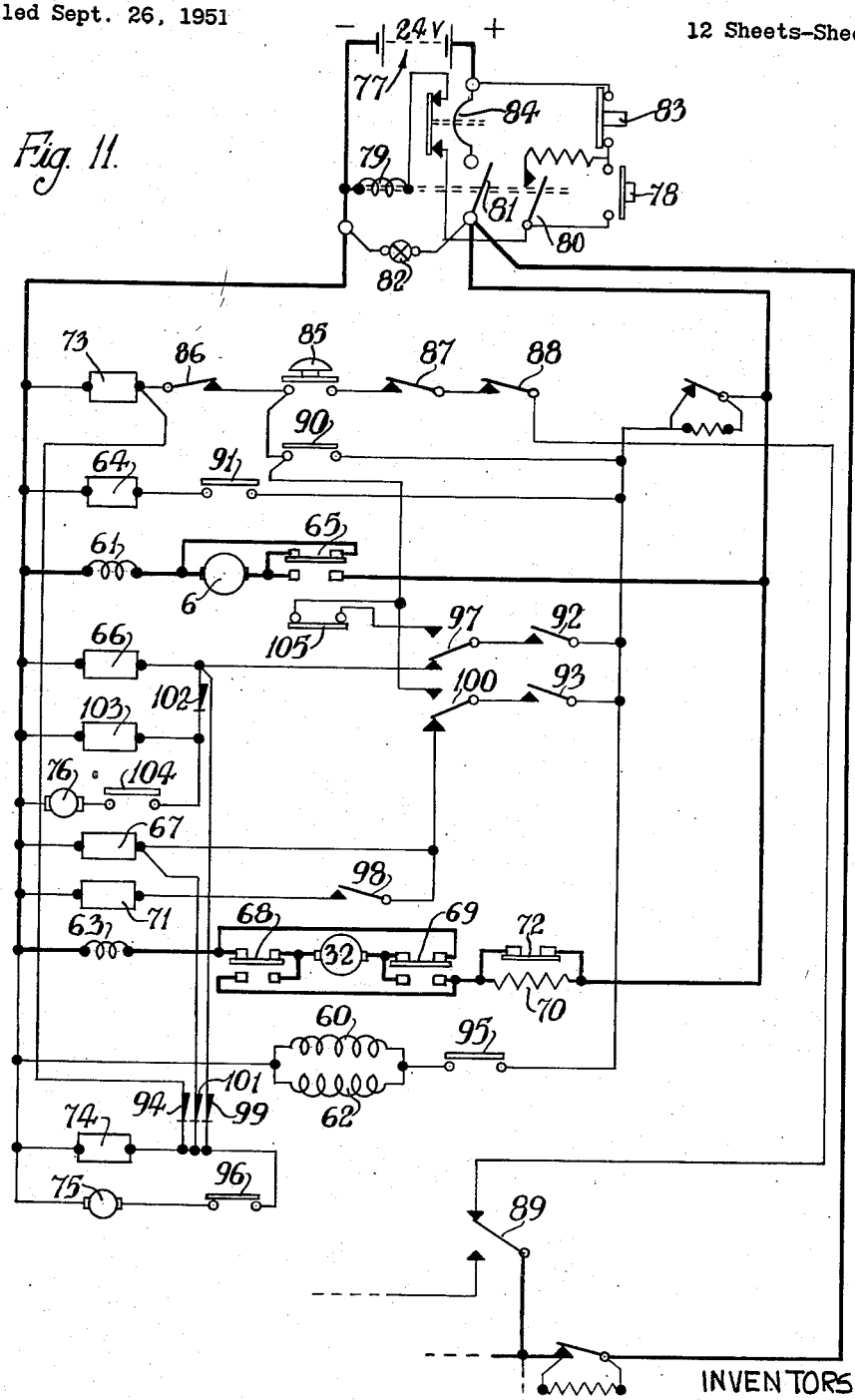

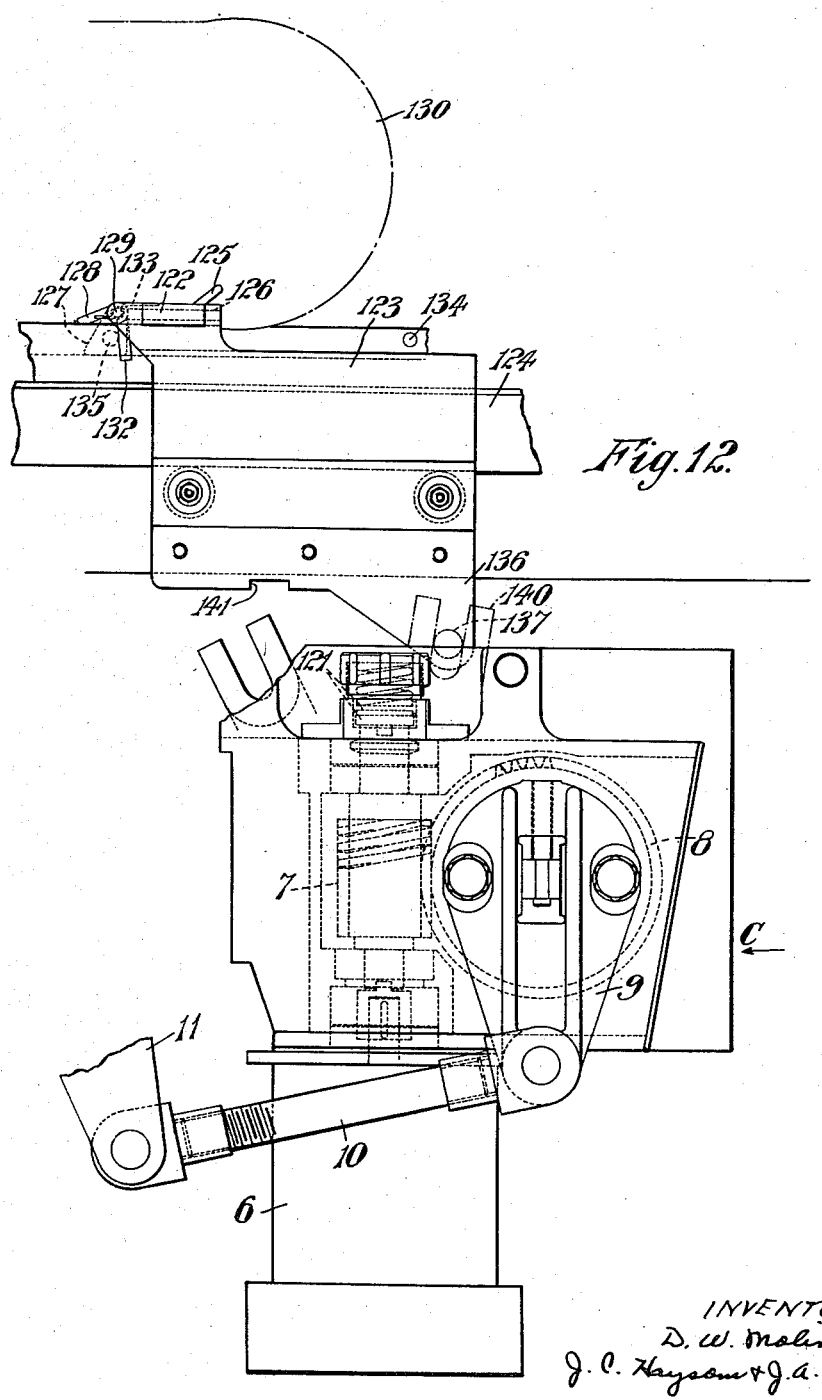

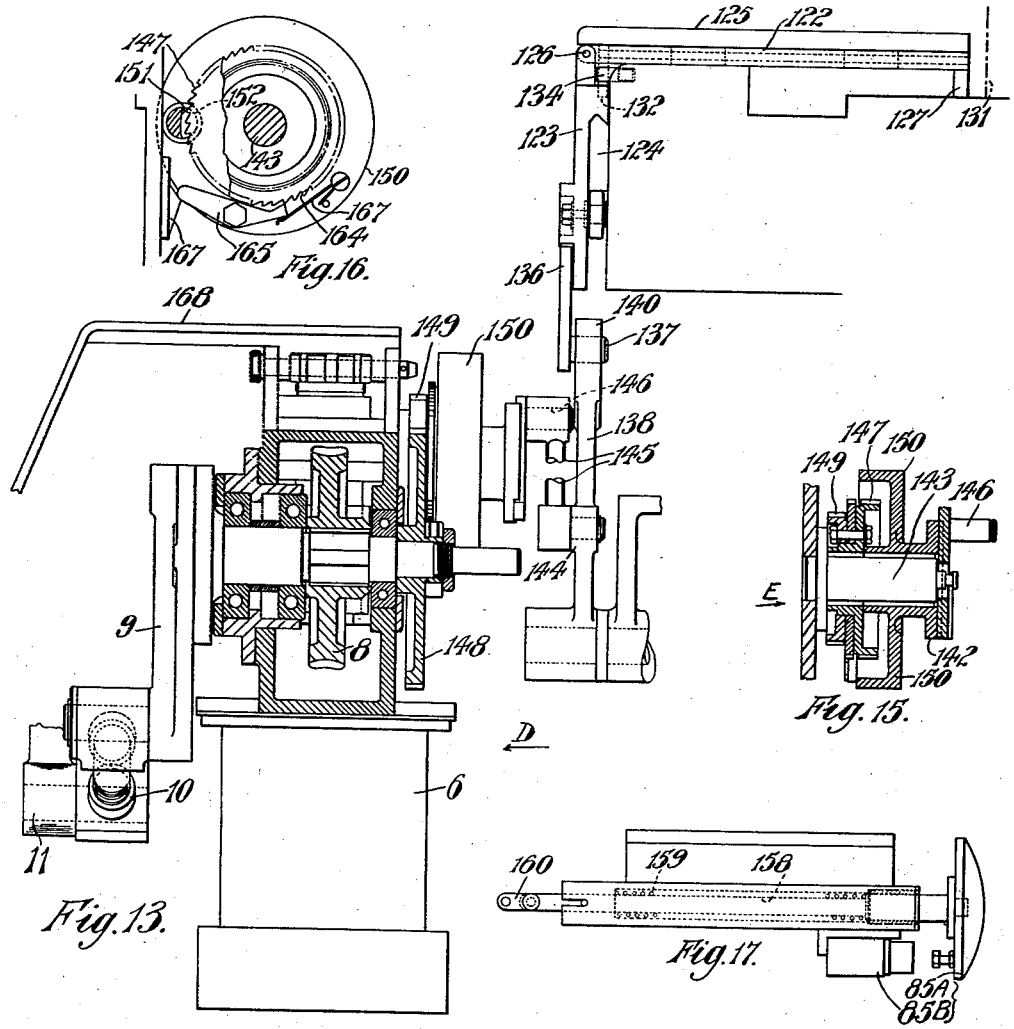

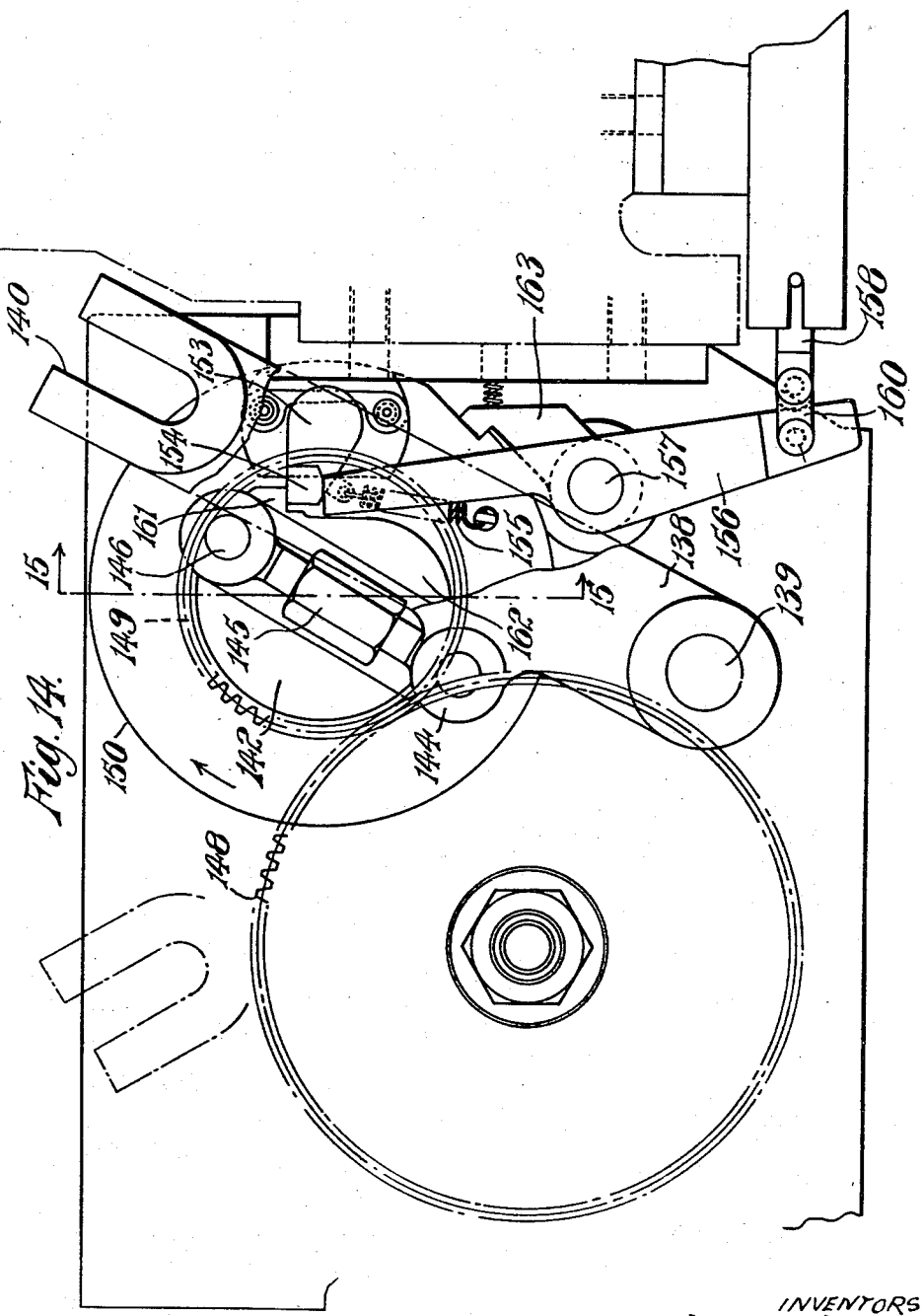

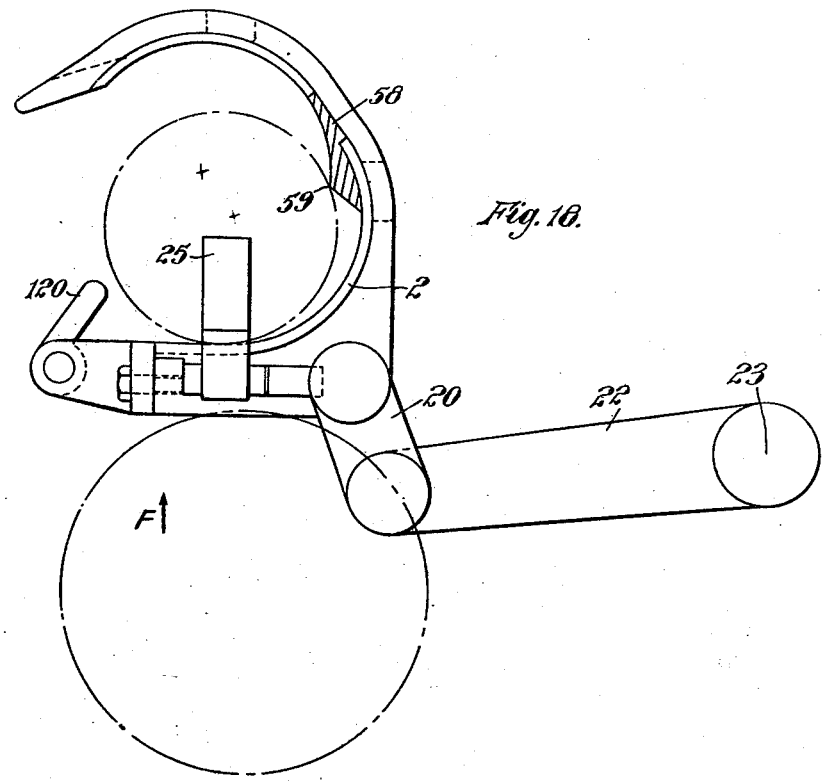
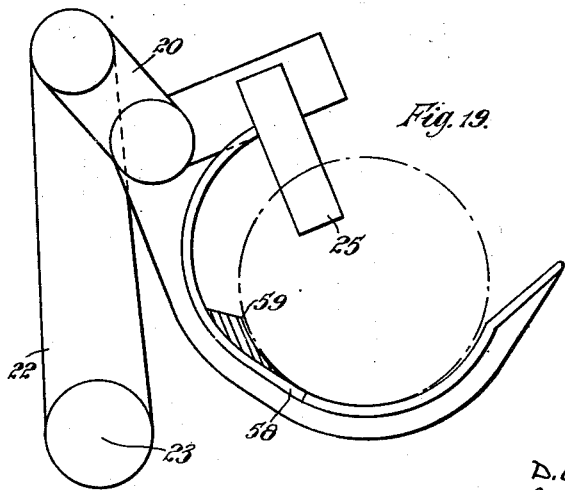

United States Patent Office 2,708,391
Patented May 17, 1955

2,708,391
LOADING APPARATUS FOR ORDNANCE

Desmond Walter Molins, John Charles Haysom, and James Arthur Mason, London, England Application September 26, 1951, Serial No. 248,291
Claims priority, application Great Britain October 3, 1950
8 Claims. (Cl. 89—45)

This invention concerns improvements in or relating to loading apparatus for ordnance. The apparatus is intended for use in loading separate ammunition (that is, ammunition in which the projectile and charge are loaded separately) into a gun, and employs two loading trays, one of which is adapted to receive a charge (and which will for convenience be referred to as the "charge tray") while the other is adapted to receive a projectile, (and will be referred to as the "projectile tray"). The apparatus is particularly intended for use in a small confined space, as for example in the turret of a tank, where it is important that the apparatus should be small and compact and should be able to operate in close proximity to the gun.

According to the present invention there is provided loading apparatus for ordnance, comprising a projectile tray and a charge tray arranged to be positioned side by side at a firing position aside and clear of the breech, and movable in convergent paths so that the projectile tray and later the charge tray is moved to a ramming position.

Further according to the present invention there is provided loading apparatus comprising a projectile tray and a charge tray pivotally connected so that one can swing relatively to the other, and movable respectively in directions transverse to the axis of the gun barrel between a firing position aside and clear of the breech at which position the trays are side by side and a ramming position at which the projectile tray and the charge tray respectively are positioned in turn, the arrangement being such that both trays are caused to move simultaneously from the firing position and during such movement one tray swings relatively to the other whereby the projectile tray reaches the ramming position first and wherein after ramming of the projectile the other tray moves to said position.

The projectile tray may be pivotally mounted on the charge tray so as to be positioned above the latter in the firing position and to be swingable downwards and towards the axis of the gun barrel on movement of the charge tray towards said axis, and upwardly on return movement of the charge tray. The swinging of the projectile tray about the charge tray may be effected by link mechanism comprising a lever arm on the projectile tray and a link connecting said arm to a fixed part, whereby movement of the charge tray causes the said arm to turn about its pivot and so swing the projectile tray.

The apparatus may be provided with a ramming device comprising two rammers for ramming the projectile and the charge respectively, both said rammers being operable by a single driving means adapted to impart a ramming stroke to one rammer while simultaneously causing the other rammer to be retracted. The said ramming device may comprise a cable or like flexible member for each rammer, said members being connected to a rotatable member so as both to be movable in opposite directions by rotation of said member in one direction, and actuating means (e. g. an electric motor) to rotate said member alternately in one direction and the other so as to impart a ramming stroke to each rammer in turn. Flexible drive means may be provided to connect the rotatable member with the said actuating means, so as to permit relative movement between the actuating means and the rotatable member on movement of the said trays.

In order that a tray may be filled before the rammer is retracted, one at least of the said rammers may comprise a yieldable rammer head which is spring-urged towards an operative position for engaging and ramming a charge or projectile as the case may be, and is adapted to yield so as to slip past a charge or projectile while being retracted, and to spring into its operative position when fully retracted behind the charge or projectile. As will appear from the following description, in the specific constructions described only the rammer for the charge need be provided with a yieldable rammer-head, since the projectile rammer will normally be retracted when the trays are in the firing position and a fresh charge and projectile are placed in their respective trays.

Still further according to the invention there is provided loading apparatus for ordnance, comprising two loading trays, a rammer associated with each tray, and means to move both said rammers simultaneously in opposite directions, so that one rammer executes a ramming stroke while the other is being retracted. The said means may comprise a rotatable drum and cables for one rammer and a chain and sprocket wheel drive for the other, the arrangement being such that rotation of the drum causes the cable to move a rammer in one direction while the chain moves the other rammer in the opposite direction.

Loading apparatus according to the invention will now be described by way of example with reference to the accompanying drawings in which:

Figure 2 is a view similar to Figure 1 with the parts in a different position.

Figure 3 is a side elevation of Figure 2 looking in the direction of the arrow A and partly broken away.

Figures 4 and 5 are sections of Figure 3 on the lines 4—4 and 5—5 respectively.

Figure 6 is an enlargement of part of Figure 2 showing details of a projectile rammer drive.

Figure 7:
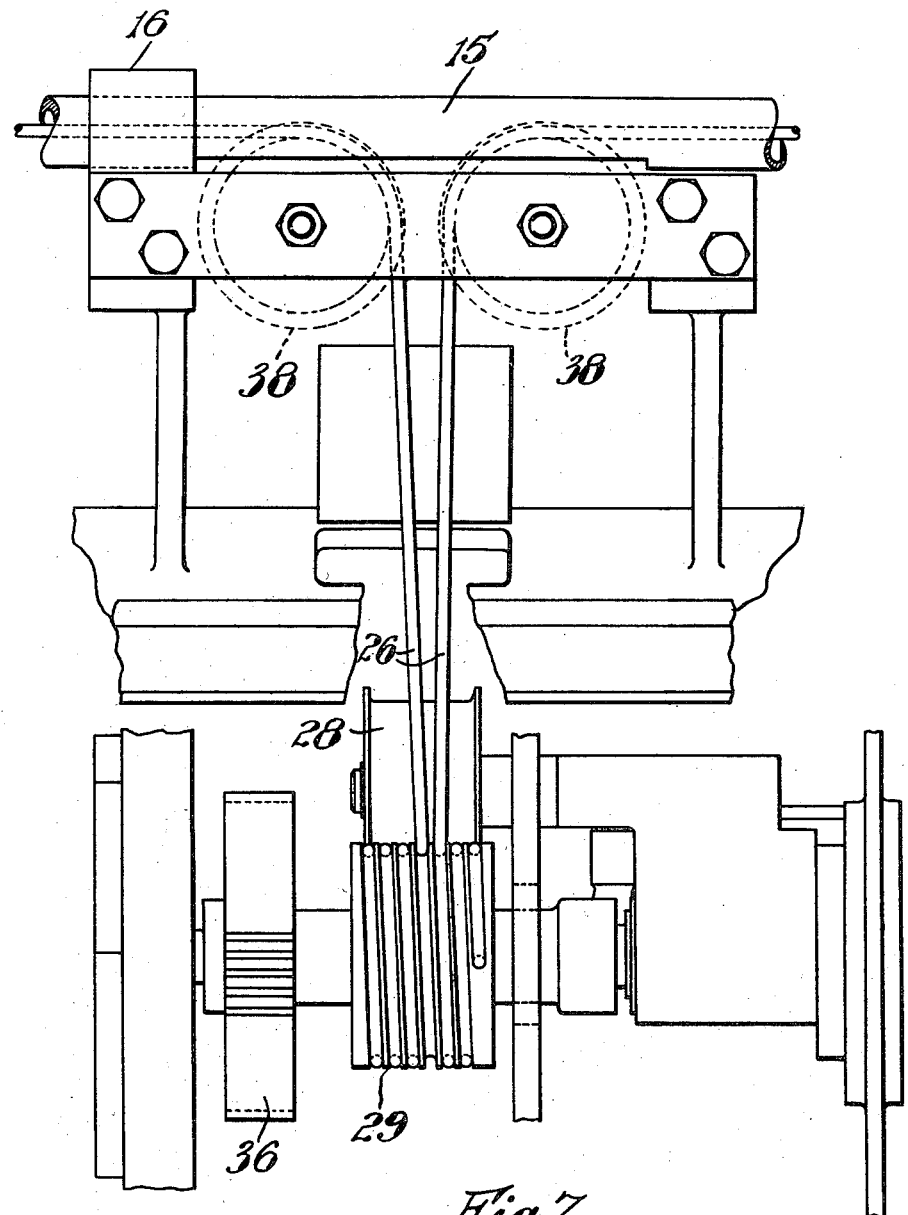

Figure 7 is a side elevation of Figure 6 looking in the direction of the arrow B.

Figure 8 is a section of Figure 6 on the line 8—8.

Figure 9 is a section of Figure 8 on the line 9—9.

Figure 10 shows details of a projectile rammer.

Figure 11 is a circuit diagram.

Figure 12 is a view looking at the rear end of the breech ring showing a tray motor and other parts.

Figure 13 is a view of Figure 12 looking in the direction of arrow C and partly in section.

Figure 14 is a view looking in the direction of the arrow D Figure 13.

Figure 15 is a section of Figure 14 on the line 15—15.

Figure 16 is a view of Figure 15 looking in the direction of the arrow E.

Figure 17 is a view of a part shown broken in Figure 14.

Figure 1:
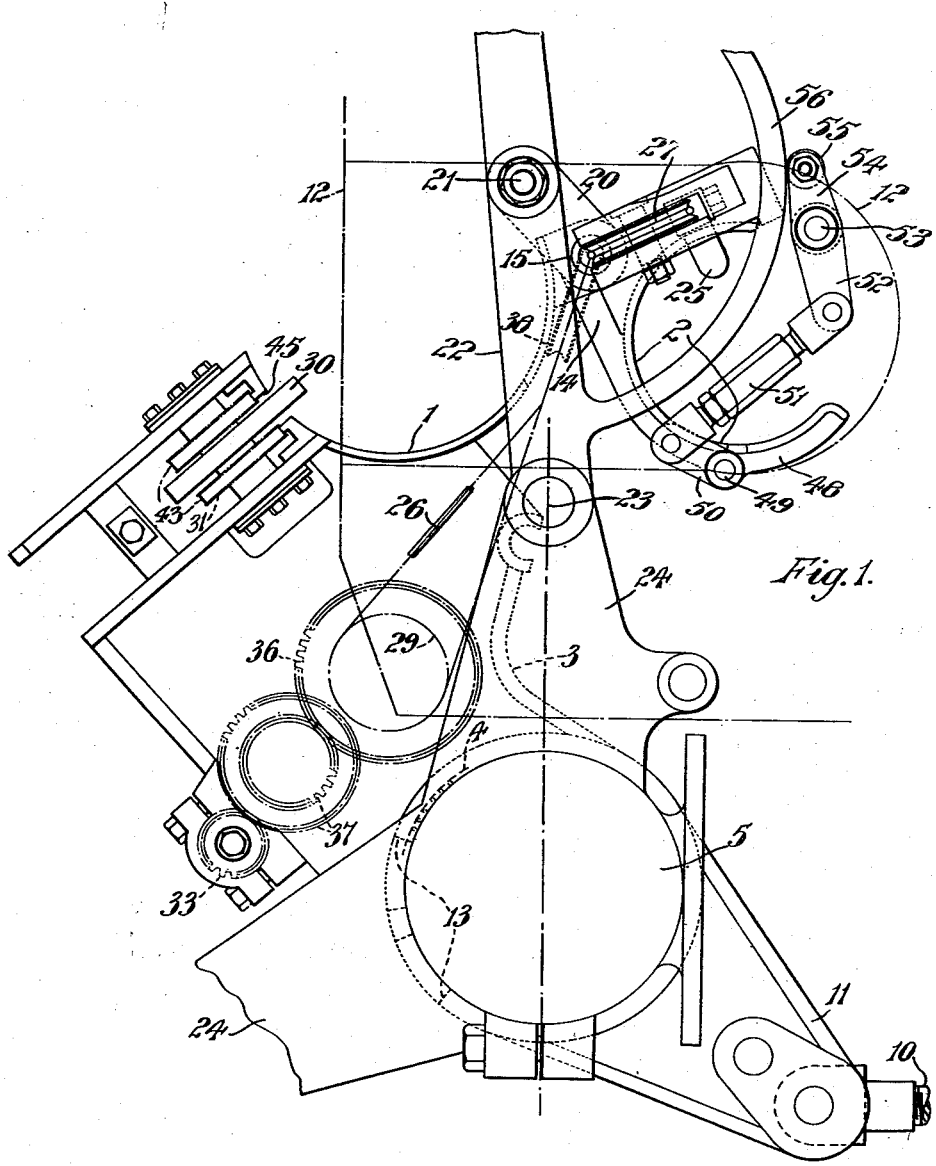
Figure 1 is a view looking at the rear end of the breech ring of a gun showing the apparatus fitted thereto.

Figure 18 shows a modification to Figure 1.

Figure 19 is a view similar to Figure 18 with the parts in a different position.

Figure 20 is a view looking in the direction of the arrow F, Figure 18.

Referring to the drawings the invention will be described first with reference to Figures 1 to 17 whereafter an improved form of projectile tray will be described with reference to Figures 18 to 20.

The apparatus is intended for use in loading separate ammunition (that is, ammunition in which the projectile and charge are loaded separately) into the breech of a gun which is mounted in a tank. Since the space available in the tank turret is very limited, the loading apparatus is designed so as to be relatively small and close to the gun, in order to leave as much room as possible for the operator to work and for the storage of ammunition.

The loading apparatus comprises two loading trays, namely, a charge tray 1 to hold the charge which is contained in a cartridge case, and a projectile tray 2 to hold the projectile. These trays are arranged side by side and parallel to one another, see Figures 2 and 3 so that the projectile and charge are held side by side and thus occupy the minimum of space lengthwise of the gun. When the trays are referred to herein as being arranged "side by side," this is to be understood to mean that they are arranged next to one another, as distinct from being arranged one behind or to the rear of the other. As will shortly be described, the trays in the present construction are at times arranged one above the other, see Figure 2, and at other times alongside one another, see Figure 1, and the expression "side by side" is to be understood to include both such arrangements.

The charge tray, which is the larger of the two (since the cartridge case holding the charge is of greater diameter than the projectile) is mounted on a rocking bracket or the like 3 rotatable on bearings 4 which surround the cylindrical recuperator casing 5 of the gun. The tray 1 is arranged to be rocked to and fro between a firing position, Figure 2, at which the tray is aside and clear of the breech so as to be out of the way of the breech during recoil, and a ramming position at which the tray is in line with the breech so that the charge can be rammed into the breech. In Figure 1 the projectile tray 2 is at the ramming position but as will be explained later the charge tray 1 also eventually moves into this position.

The expression "aside the breech" when used herein is intended to refer to a position, Figure 2, offset from the path of the breech when the latter recoils, such that the breech can move past it on recoil and runout. In the present construction now being described by way of example, the "firing position" is beside the aforesaid path of the breech, but the expression "aside the breech" could include other positions, for example, a position above the recoiling breech. The expression "ramming position" when used herein with reference to a loading tray is to be understood to mean a position such that the projectile or charge contained in the respective tray can be rammed into the breech.

The rocking movement of the tray is imparted to the tray by an electric motor 6, Figures 12 and 13, which drives a worm 7 engaging a wormwheel 8. To this wormwheel is coupled a crank 9 having a connecting rod 10 pivoted thereto which is connected to a lug 11 of the rocking bracket 3. Suitable stops 13, Figure 1, are provided to limit the swinging movement of the tray in each direction.

The projectile tray 2 is pivotally mounted on the charge tray in such a way as to be movable with the charge tray and also pivotally movable relatively to the charge tray. The projectile tray is held by a bracket 14 rotatable on a cylindrical tube 15 which is held in bearers 16 on the side of the charge tray, and the tray can be swung downwardly about the pivot 15 from a position, Figure 2, at which it is above the charge tray 1, to one, Figure 1, at which it is alongside the charge tray, when the charge tray is swung over towards the breech axis, and the tray 2 is in the ramming position, in line with the breech, that is, the position shown in Figure 1.

Referring particularly to Figure 3, the charge tray is of the full width shown in Figure 1 as far as the inner or breech end of the projectile tray. The projectile tray finishes about 1" clear of the face of the breech ring 12. The charge tray however continues in a diminished width nearly as far as the chamber face. The tray 1 in the construction illustrated extends for 8" beyond the breech ring face while the chamber face is 10" from said ring face. Thus the front end of the charge tray is just to the rear of the chamber face, while the projectile tray, which is shorter than the charge tray, is arranged so that its front end is just to the rear of the breech ring. The reason for this is that the projectile tray, as explained above, is arranged to be swung about the charge tray between a position at which it is above the latter and a position at which it is alongside the charge tray and located in front of the breech. The aperture of the breech ring is wide enough to accommodate the front part of the charge tray when the latter swings in, but not wide enough to allow the projectile tray 2 to pass within the breech ring while positioned above the charge tray or while swinging up or down about the latter. Moreover it is necessary to swing the trays further over after the projectile has been rammed, so as to bring the charge tray 1 to the charge ramming position, and this would not be possible if the projectile tray extended within the breech ring. Thus the projectile tray is arranged rearwardly of the breech ring so that neither the projectile nor the tray 2 can foul the breech ring during the swinging movements of the trays.

The swinging of the projectile tray about the charge tray is effected by movement of the charge tray, in the following manner. Fixed on the cylindrical tube 15 on which the projectile tray is mounted is a lever arm 20 which is pivoted at 21 to a link 22, which extends towards the axis of the gun barrel. The other end of the link 22 is pivotally connected at 23 to a bracket 24 fixed to a non-recoiling part of the gun. The link 22 and its associated parts are located well behind the rearmost point to which the gun recoils so as to avoid any possibility of damage on recoil.

When the charge tray is swung over towards the ramming position, that is, moved from the position shown in Figure 2 and over to and beyond that shown in Figure 1, the pressure of the link 22 on the downwardly depending arm 20 causes the latter to swing relatively to the charge tray, and so to rotate the tray on the cylindrical tube 15 so that the projectile tray swings downwardly, towards the gun barrel axis, under the control of the link, to a position alongside the charge tray. The arrangement of the parts is such that the combined movements of the projectile tray, both with and relative to the charge tray, bring the projectile tray to the ramming position, Figure 1, in front of the breech so that the projectile can be rammed. Further movement of the charge tray causes the projectile tray to move past the breech ring and brings the charge tray to the ramming position in front of the breech, so that the charge can be rammed into the breech behind the projectile.

When the charge tray is swung in the reverse direction, the projectile tray swings up to its original position above the charge tray, so that when the charge tray reaches the firing position at which it is aside and just clear of the breech, the projectile tray is positioned above it and is also aside and just clear of the breech. Thus it will be seen that very little space at the side of the gun is needed to accommodate both trays, since neither of them need be moved further aside the breech than is necessary to ensure that each is just clear of the breech during recoil of the gun.

The swinging or rocking movement of the charge tray towards the ramming position is made in two stages, the first of which brings the projectile tray to the ramming position in front of the breech, and the second, which occurs after a suitable interval while the projectile is inserted into the breech, brings the charge tray to the ramming position. The return movement can of course be a single one. The controls of the motor 6 for effecting these movements will be discussed later.

Ramming of the projectile and the charge is effected by arangements now to be described: For the projectile tray 2 a rammer 25 is provided which is moved to and fro along the tray by a wire cable 26 which extends along the length of the tray. The cable passes over pulleys at each end of the tray, one marked 27 being shown in Figures 1 and 2, and is guided, by a guide pulley 28 Figures 6 and 7, on to a helically grooved drum 29 around which it is wound. This drum is positioned at about the mid-length of the tray and the cable passing upwards from the drum 29 goes over further guide pulleys 38, Figures 6 and 7. Rotation of the drum 29 in one direction or the other effects a ramming stroke or a return stroke of the rammer to which it is connected. The ramming device for the charge comprises a rammer 30 attached to a pair of chains 31, driven by a sprocket wheel 35.

Both rammers are arranged to be operated by a single electric motor 32 in such a way that a ramming stroke by one rammer occurs simultaneously with a return stroke by the other. As the motor 32 is fixed to the gun cradle or support it is only indicated diagrammatically in Figure 3. The grooved drums 29 for the projectile rammer cable and the chains 31 of the charge rammer 30, are driven from the motor 32 through a common gear wheel 33 which is rotated by a flexible shaft 34 driven by the electric motor. The flexible shaft is provided in order that the rammer drum and sprocket wheels, which drive the chains 31, may move relatively to the motor when the trays move between the firing position and the two ramming positions. The arrangement is such that the two rammers are caused to move in opposite directions. Thus when one rammer has executed a ramming stroke, it is only necessary to reverse the motor to cause that rammer to be retracted while the other rammer moves forward in its ramming stroke.

Since the projectile tray, as already mentioned, is shorter than the charge tray, the two rammers require strokes of different length, and appropriate gearing, now to be described, is provided to give the required strokes to the respective rammers.

Referring first to Figures 1 to 3, it will be seen that the drum 29 is attached to a large gear wheel 36 which is driven by compound gearing 37 from the small gear wheel 33. From Figure 8 it will be seen that the compound gear wheel 37 is fixed on a shaft 39 to one end of which is fixed a bevel gear wheel 40. This wheel engages another bevel gear wheel 41 on a shaft 42, Figure 9, to which is fixed a double sprocket wheel constituting the aforesaid sprocket wheel 35. The chains 31 pass over the wheel 35 and various idlers marked 43 in Figure 3.

Due to the arrangement just described whereby the two rammers simultaneously execute opposite strokes, it will be seen that when the trays are in the firing position, if the projectile rammer 25 is in position behind the projectile ready to ram it, the charge rammer 30 must be at the front end of the charge tray. In order to enable both the charge and the projectile to be placed in their trays while the latter are still in the firing position, and to enable the charge rammer to be subsequently retracted, the charge rammer 30 is provided with a yieldable rammer head consisting of a spring pawl which is spring-urged in the direction of the arrow, Figure 3, by a torsion spring (not shown) towards an operative position and can be depressed by rotation about its pivot pin 44 by the weight of the charge into a suitably arranged slot or groove 45 running along the length of the charge tray 1. Thus when the projectile is rammed and the charge rammer is retracted, the spring pawl slips beneath the charge along the tray and finally snaps up into its operative position, see Figure 3, behind the charge ready to ram it when the gear wheel 33 is rotated in the reverse direction. During ramming the tail of the rammer 30 rides on a rail 46, see Figure 5, to take the reaction.

Suitable means for automatically actuating the tray-swinging and rammer motors in desired sequence are provided so as to enable the whole loading operation to be performed rapidly and with the minimum amount of handling by the operator or operators and will be described with reference to Figure 11.

The motors cause the trays and rammers to move at the desired times in proper sequence so that the projectile and then the charge can be rammed into the gun and the trays then returned to the firing position. The whole cycle of operations can be made automatic, and is so described and illustrated, so that when the charge and projectile have been placed into their respective trays, the operator has only to press a starter switch to cause the gun to be automatically loaded. If the gun is equipped with breech mechanism of the semi-automatic type, the breech will close automatically when the charge is rammed, and the gun will be ready to fire.

The major features of the invention have now been described and before proceeding further with a detailed description of the rest of the drawings, a short description of the operation will be given whereafter the circuit diagram, Figure 11, will be explained so that the method of obtaining the various movements recited will be understood.

The operation of the apparatus is as follows. The operator places a projectile in the projectile tray, and a charge contained in a cartridge case, in the charge tray, both trays being in the firing position clear of the breech. The projectile rammer is behind the projectile and the charge rammer is at the front of the charge tray and its rammer head is depressed into its slot by the weight of the charge. The operator then presses a starter button 85, Figures 11 and 17, and the tray motor causes the charge tray to swing from the firing position inwardly towards the axis of the gun barrel. This movement causes the projectile tray to swing downwardly while at the same time moving inwardly with the charge tray. As the projectile tray reaches the ramming position, the tray motor stops and the rammer motor starts, causing the helical drums 29 to rotate so as to move the projectile rammer forward and so ram the projectile.

The projectile rammer moves forwardly until stopped by a resilient stop, shown diagrammatically at 47, Figure 3 which intercepts an abutment on the chains 31 and the projectile thereafter moves under its own momentum into the breech, being as it were thrown into the breech by the force of the ramming stroke. During the projectile ramming stroke the charge rammer 30 is retracted, slipping under the charge until it snaps up behind the base of the cartridge case containing the charge.

The rammer motor stops and the tray motor starts up again and the trays are swung further inwardly until the charge tray reaches the ramming position, when the tray motor stops and the rammer motor starts up, in the reverse direction, so as to actuate the charge rammer. As the charge tray is just behind the breech the charge can be rammed fully home by the rammer. During this ramming stroke the projectile rammer is retracted and is thus ready for the next projectile to be inserted in the projectile tray.

Then the rammer motor stops and the tray motor starts up to swing the trays back to the firing position. Meanwhile the breech, if of the semi-automatic type, has closed, and the gun is ready to fire when the trays reach the firing position.

Referring now to Figure 11, the tray motor has its armature marked 6 to agree with the previous general designation of the motor, and has shunt field 60 and a series field 61. Similarly the rammer motor has its armature marked 32 and it also has shunt and series fields 62 and 63 respectively.

The tray motor is controlled by a contactor 64 having a contact bar 65 while the rammer motor is controlled by two contactors namely a first-ram contactor 66 and a second-ram contactor 67. As will be apparent, the rammer motor goes in one direction for the first ram and reverses for the other so these two contactors may be regarded as "up" and "down" respectively. These contactors have contact bars 68 and 69 respectively. A resistance 70 is provided for taking a load when the rammer motor stalls at the end of a charge ramming stroke and this resistance is controlled by a stall contactor 71 having a contact bar 72.

In addition the controls comprise relays 73 and 74, and sundry switches which will be named and described as occasion arises.

There are also provided two small motors marked 75 and 76. These are permanent magnet motors having a flywheel on the armature spindle. In use they are first driven by applied current and when this ceases they continue to rotate for some while under the momentum of the flywheel and generate current to "hold-on" the contacts of associated relays to maintain the shunt fields of motors 6 and 32 during the slowing times of the motors whilst being dynamically braked.

Current is supplied to the whole circuit from a 24 volt battery 77. A setting switch 78, when engaged, causes a coil 79 to be energised and its armature pulls over two switch arms 80 and 81 to the other position. 82 is an indicator lamp. Once the switch 78 has been pressed the apparatus is live until a stop switch 83 is pressed or a thermal circuit-breaker 84 operates.

Assuming the set switch 78 has contacted, the apparatus is ready for work and as soon as the trays have received round and charge respectively the operations will start if the operator presses a starting button 85. This button is shown, in Figure 11, simply as a switch, but the movement is also utilised to start a mechanical clutch, explained later with reference to Figures 15, 16 and 17.

This button causes current to be fed to the coil of the relay 73 through a switch arm 86, and arms 87 and 88 and 89, whose functions will be explained later, and the contact bars 90 and 91 of the relay 73 close.

Bar 91 feeds current to the tray motor contactor 64 and its contact bar 65 moves down and current is fed to the armature and series field of the motor 6. The contact bar 90 constitutes a "hold-on" as the press button 85 is released. The tray motor controls the movements of switches 86, 92 and 93 but these are only moved to their opposite positions for short times during the operation and stay in the positions shown for most of the time. Thus owing to the tray motor movement 86 opens for an instant, just before the tray 2 reaches the ramming position.

The opening of switch 86 breaks the circuit to the coil of relay 73 but meanwhile a feed parallel to said coil and through a half-wave rectifier 94 has energised the coil of relay 74 so its contact bars 95 and 96 close. This causes the shunt field of the motor to be energised and the flywheel motor 75 to run and acquire some momentum. When the coil of relay 73 is switched out of circuit the contactor 64 is also de-energised and its contact bar 65 moves back to the position shown and the motor is dynamically braked, the armature being short-circuited by the contact bar 65 and the shunt field 60 being maintained by means of the flywheel motor 75 which "holds on" the relay 74 and thus maintains the circuit for the shunt field.

When the tray 2 reaches ramming position, switch arm 92 closes for a short time and a circuit is made through the first ram contactor 66 through a contact arm 97. The contact bar 68 moves down and current is fed to the rammer motor through its series field 63, and the contact bars 69 and 72. The motor starts and rams the projectile. This motor also controls the switch arm 97 and another 98 so 97 goes up at the end of the ramming stroke. The shifting of 97 breaks the circuit of the "up" contactor 66 and its bar 68 moves back to short-circuit the armature of the rammer motor for dynamic braking, the shunt field 62 being energised during ramming by means of relay 74 and continued during dynamic braking by the flywheel motor 75 which holds the contact bars 95 and 96 of the relay 74, the relay first receiving current in this case through a half-wave rectifier 99.

The feed of current to the contactor coil 66 has caused current through a half-wave rectifier 102 to energise the coil of a relay 103. Its contact bars 104 and 105 close and open respectively and the flywheel motor 76 starts. When the contactor 66 is de-energised the motor 76 will keep the coil of relay 103 live and hold the bars 104 and 105 in position for a short time, thus preventing contact bar 105 from closing for a time sufficient for the projectile to enter the breech (after it leaves the rammer 25) before further movement of the tray occurs.

The tray motor starts again, its contactor 64 being energised as before by relay 73 now receiving current through switch arms 92 and 97 the contact bar 105 and the switch 86 which, as aforesaid, was only opened for an instant during the first tray movement. When the tray reaches the charge ramming position its motor closes switch arm 93, through the reduction gearing previously described and a circuit is established through an arm 100 whose position is controlled by breech block movements. The contactor 67 is energised and its contact bar 69 is moved so the rammer motor starts, moving in the opposite direction to its previous movement. The charge is rammed, the rammer motor stalls to hold the charge until the breech block moves over to mask the charge and as the charge case flange strikes the breech block release catches, the switch 100 changes over and the contactor 67 is de-energised so the bar 69 moves back to short-circuit the armature of the rammer motor. Its shunt field 62 is maintained by means of current from the flywheel motor 75 "holding-on" the relay 74 as before, the motor having been set into motion by current from 67 through a half-wave rectifier 101. Meanwhile as the switch arm 98 is closed by the movement of the motor 32, the stall contactor 71 has been energised and its contact bar 72 opened so that at the end of the ram any excess current due to stalling is absorbed by the stall resistance 70.

As switch 93 is closed and 100 is now in the up position (i. e. breech closed) there is again a circuit for causing the contactor 64 to operate and the tray motor starts again and returns the trays to the firing position by continued movement of the crank 9, the movement opening the switch 93 and the motor is dynamically braked by the opening of switch arm 86.

As the tray is a heavy mass, particularly when loaded any tendency to over-run is prevented by a friction brake 121 operated by longitudinal movement of the worm 7 Figure 12 in exactly the same manner as described in U. S. Patent No. 2,395,813.

The switch arm 87 is a breech interlock switch which is closed when the breech is properly open so that the apparatus cannot start unless the breech block is in the right position. 88 is a similar switch controlled by the tray. Switch arm 89 leads current to a case ejector control apparatus forming the subject of the copending United States application Serial No. 249,048 where its purpose is fully explained. The arm 89, so far as the present invention is concerned, may be regarded as permanently in the position shown.

It will be noted from Figure 2 that when the tray 2 is in the firing position, i. e. where the projectile is put into the tray, the tray is inclined to the left. At the end of the movement to the ramming position, Figure 1, during which movement the tray rotates to a considerable extent, the tray is tilted to the reverse position to such an extent that the tray part marked 2 in Figure 1 no longer affords adequate support for the projectile. Moreover as the action of the apparatus is very rapid the projectile is liable to be thrown out of the tray.

Two ways of meeting this difficulty are illustrated one being shown in Figures 1 and 2 while an improved device is shown in Figures 18 and 19. Referring to Figures 1 and 2, to afford proper support at ramming and to embrace the projectile more completely during transit to the ramming position the projectile tray 2 comprises a flap 48 hinged to the tray at 49 and of a radius similar to that of the tray, and means is provided for controlling said flap so that at the ramming position the flap forms a smooth continuation of the tray interior while at the firing position the flap is swung so that its free edge moves away from the centre of the tray arc. In this way the tray embraces the projectile sufficiently at the ramming position while at the firing position the flap is out of the way and does not hinder loading.

To the hinge pin 49 is fixed a short lever 50 coupled by a link 51 to one arm 52 of a double armed lever pivoted at 53 on a bracket fixed to the exterior of the tray near the other edge thereof. The other arm 54 of the lever has a cam roller 55 mounted on it.

A cam rail 56 shaped as shown is fixed to the link 22, engages the roller 55 at times and moves the flap 48.

The flap 48 is positively actuated to move it to an open position when the tray is in the firing position. This is accomplished by a cam 57 which engages the roller 55 and moves the flap in the reverse direction to that given by the cam 56. Almost as soon as the tray starts to move towards the ramming position the cam roller 55 engages the cam rail 56 and the flap is swung on its pivot so that it then forms a smooth continuation of the curve of the tray interior, see Figure 1.

Referring now to Figures 18 to 20 it will be seen that the tray 2 is no longer of circular-arc section but consists of two circular-arc portions struck from the centre marked by crosses in Figure 18 and joined by a tangential portion 58 which is formed up into a rib 59 which divides the tray into two compartments. When the round is put into the tray it occupies the position shown in Figure 18, where the small circle in broken lines indicates the projectile and the large circle, the charge. When the tray goes over to the projectile ramming position, Figure 19, the round rolls over the rib and into the other compartment. A spring controlled flap 120 prevents the round from falling out in transit or being thrown out in the tray movement.

In some cases, difficulties may arise in ramming a projectile with the apparatus so far described. For example, the projectile may be so shaped that there is a risk that it may foul the extractors or the edges of the breech ring, or some parts of the projectile may be fragile and easily damaged. In certain cases there is also a risk that a projectile after being rammed into the breech may slip out again, particularly at high angles of elevation. This is particularly so if the projectile is, as is sometimes the case, fairly small and considerably narrower than the breech opening.

To overcome these difficulties there is provided means to guide the projectile as it moves between the loading tray and the breech, comprising a guide member or tray 122, Figures 12 and 14, arranged to move between a position within the recess 130 in the breech ring at which it can guide the projectile during ramming and an inoperative position at which it is out of the way of the breech block when the breech closes.

The guide member 122 consists of a small guide tray and extends from the rear face of the breech ring 12, Figure 13, almost to the chamber face 131. The guide tray is mounted on a slide 123 which is arranged to move on a horizontal track 124 extending along the rear face of the breech ring 12 below the level of the breech, see Figure 12. Movement of the slide along the track, when the breech is open, causes the guide tray to move sideways between a position in front of the open breech and an inoperative position aside the breech and just beside the breech block when the latter has moved over to close the breech. In Figure 12 the tray is shown at an intermediate position. When the guide tray is positioned in front of the open breech it can serve the double purpose of acting as a guide for a projectile which is rammed into the breech from the projectile tray, and also of acting as a stop to prevent backward movement of the projectile out of the breech after it has been rammed. For this latter purpose the guide tray is arranged so that its front edge 125 which is raised by a ramp as the guide tray moves inward partly masks the breech opening, so that a projectile which may tend to slip back is intercepted by the front edge of the tray and prevented from leaving the breech.

The guide tray is moved into position in front of the breech so as to bridge the gap between the open breech and the front end of the projectile tray when the latter is in the ramming position and the projectile is rammed. After the projectile has been rammed the two trays 1 and 2 again move inwardly so that the projectile tray is carried past the breech and the charge tray moves into the ramming position.

In order to leave room for the charge tray to come to the ramming position and for the charge to be rammed without risk of fouling, the guide tray is moved sideways towards its inoperative position as the charge tray swings into the ramming position. This sideways movement of the guide tray does not, however, begin until the charge tray has been moved in far enough to enable the front end of the cartridge case which contains the charge to mask the breech so as to be behind the projectile which is in the breech. As soon as this occurs, the guide tray 122 is moved sideways and passes beneath the charge tray and is brought to its inoperative position. The guide tray is hinged at 126 on the slide 123 and has a support 127, Figure 14, at its other end which rests on the inner surface of the breech ring and rides over the aforesaid ramp to raise the front 25.

The edge of the tray remote from the gun axis is formed by a hinged plate 128 pivoted at 129 and provided with a tail 132. A torsion spring 133 normally keeps the plate 128 in the down position. Stops 134 and 135 engage the tail at times. The stop 134 lifts the plate 128 against the action of the spring 133 when the tray is in ramming position while the stop 135 ensures that the plate 128 is down when the charge tray is moving over, in case the spring 133 fails to ensure this. The stop 135 is shown in chain lines because its true position is much further to the left and beyond the confines of the drawing.

The arrangements for moving the guide member are as follows. The slide 123 has a part 136 which extends downwards and has fixed to it a pin 137 which extends forwardly—that is, towards the breech ring. A lever 138, Figure 14, is pivoted at 139 on a non-recoiling part of the gun, that is, the casing containing the wormwheel 8 and extends upwardly so as to be swingable sideways about its pivot, and has a forked upper end 140. This lever is so positioned that when the gun is in battery the forked upper end receives the pin 137 on the slide part 136. The lever is arranged to swing to and fro at desired times so as to move the guide tray by pushing the slide 123 to and fro along its guide 124.

It will be appreciated that when the gun fires, the guide member 122, being carried on the breech ring, will move rearwardly on recoil. On runout, the pin 137 on the slide will again enter between the arms of the fork 140 of the lever 138 if the slide arm and lever are still both properly positioned to permit this. To ensure this the slide 122 has a groove 141 in it and this runs over a spline (not shown) formed on the top of the recuperator barrel. The fork 140 is held in position by virtue of its operating devices which will now be described and by a locking plunger (not shown) operated by the barrel movements.

The arrangements for swinging the forked lever so as to move the guide member at desired times are as follows:

The forked lever 138 is swung to and fro by crank mechanism consisting of a crank disc 142 rotatable on a shaft 143 and is driven through a one-revolution clutch described later. The forked lever 138 has a boss 144 which is linked by a connecting rod 145 to a crank pin 146 adjustably mounted in the crank disc 142. In this way the lever 138 is rocked in one direction during the first half-revolution of the crank 142, and in the reverse direction during the second half-revolution, thus causing the forked lever to move the guide member from its inoperative position to a position in front of the breech and back again. The extreme positions of the lever 138 are indicated in Figure 14. As above remarked the crank throw is adjustable and the connecting rod is also adjustable for length by the construction shown. Thus the movement and positioning of the tray can be accurately adjusted. During the reversal of the direction of movement of the forked lever the part 125 of the guide tray continues to mask the projectile which has just been rammed into the breech, long enough to prevent it slipping out of the breech until the cartridge case in the charge tray has moved over far enough to mask the projectile.

The shaft 143 is driven in the following manner:

A ratchet wheel 147, which is rotatable on the shaft 143, is coupled by suitable gear wheels, 148 and 149, to the wormwheel 8 so as to be rotated when the trays 1 and 2 are swung. A clutch body 150 on the shaft 143 has pivoted therein a rocking pawl tooth 151 which can be rocked into or out of engagement with the ratchet wheel, the arrangement being such that when the tooth engages the ratchet wheel, the clutch body 150 on the shaft 143 is rotated, whereas when the tooth is held out of engagement with the ratchet wheel 147 the latter rotates idly. The rocking pawl tooth is formed at one end of a cylindrical shank 152, at whose other end is fixed a stop lever 153 having an abutment 154 which is adapted to be pressed in such a direction as to rotate the shank 152 against the action of a spring 155 so as to keep the pawl tooth 151 out of engagement with the ratchet wheel. A presser member consisting of a lever 156 pivoted at 157 is arranged to press against the abutment 154 so as to prevent engagement of the clutch, and can be displaced so as to allow the abutment to slip past it. When this occurs the pawl tooth turns under the action of the spring 155 and engages the ratchet wheel, whereupon the clutch body and the crank shaft are rotated. If, however, the presser member is allowed to return to its original position immediately after the clutch body starts to rotate, it will intercept the abutment 154 as the clutch body completes one revolution, and the pawl tooth will thus again be turned out of engagement with the ratchet wheel so as to break the clutch.

When the loading operation commences, the tray-swinging motor is started by pressure on the switch 85, Figure 11, and the loading trays are swung over towards the ramming position. As will be seen from Figure 17 the press button is formed of two elements namely a button and a micro-switch which are marked in this figure as 85A and 85B. The button is attached to a long shank 158 surrounded by a compression spring 159 and the inner end of the shank is coupled by a link 160, see also Figure 14, to the lever 156. Thus when the button 85A is pressed the switch 85B contacts and the clutch above-described is engaged. At the end of the revolution of the clutch the abutment 154 again contacts with the neighbouring end of lever 156 and the pawl is disengaged from the ratchet wheel. A stop or lug 161 formed on a collar 162 fixed to the shaft 143 forms a locating device to hold the lever 153 in the disengaged position. Overrun of the clutch is prevented by a further ratchet wheel 164 fixed to the wheel 147 and engaged by a pawl 165 under the influence of a spring 166. As soon as the clutch body starts to move the pawl 165 engages the teeth of wheel 164 and locks the clutch body to the ratchet wheels so that overrun is impossible. At the end of the revolution the pawl 165 is tripped by a ramp 167. A spring detent 163 holds the clutch body, and thus the lever 138 in position at the end of the movements. 168 is a guide for ejected cases and also shields the mechanism just described from injury.

What we claim as our invention and desire to secure by Letters Patent is:

1. Loading mechanism comprising a charge tray which includes a swinging arm and a receptacle for a charge fixedly carried by said arm, a projectile tray pivotally mounted on the charge tray for swinging movement thereon, linkage connecting the projectile tray to a fixed part, and means mounting said charge tray for swinging movement in directions transverse to the axis of the gun barrel between a firing position aside and clear of the breech, at which position the projectile tray is above the charge tray, and a ramming position at which the projectile tray and the charge tray respectively are positioned in turn, said linkage causing the projectile tray to swing about the charge tray downwardly and toward the axis of the gun barrel during movement from the firing position toward said axis to cause the projectile tray to reach the ramming position first.

2. Apparatus as claimed in claim 1 and comprising a ramming device including two rammers for ramming the projectile and the charge respectively, a single driving motor, driving connection between said rammers and said motor to impart a ramming stroke to one rammer while simultaneously causing the other rammer to be retracted.

3. Loading apparatus for ordnance, comprising two loading trays, two rammers, one associated with each tray, and means to move both said rammers simultaneously in opposite directions, so that one rammer executes a ramming stroke while the other is being retracted.

4. Apparatus as claimed in claim 1 wherein the projectile tray comprises means for retaining a projectile within the tray during tray movement, said means affording support to the projectile at any position occupied by the tray in its movement to the ramming position.

5. Apparatus as claimed in claim 4 wherein said means comprises a flap pivoted to an edge of the tray and forming a continuation of the tray interior contour, whereby the tray embraces the projectile for more than half its circumference, and means for moving said flap about its pivot and away from embracing position to facilitate loading.

6. Apparatus as claimed in claim 5 wherein said projectile tray comprises two circular arc portions constituting compartments, each adapted to receive and support the projectile, a rib separating said compartments over which which the projectile rolls from one compartment into the other during tray movement, said pivoted flap being attached to the free edge of the first said compartment.

7. Apparatus as claimed in claim 1 having means to guide a projectile as it moves between its loading tray and the breech, comprising a guide member, and means supporting said guide member for movement between an operative position within the recess in the breech ring at which it can guide the projectile during ramming and an inoperative position at which it is out of the way of the breech block when the breech closes.

8. Apparatus as claimed in claim 7 wherein said means comprises a part adjacent to the chamber face of the breech constituting a stop to prevent backward movement of a projectile out of the breech after it has been rammed.

References Cited in the file of this patent

UNITED STATES PATENTS

| 2,004,856 | Daum | June 11, 1935 |
| 2,062,212 | Daum | Nov. 24, 1936 |

FOREIGN PATENTS

| 368,631 | Italy | Feb. 21, 1939 |
| 719,768 | Germany | Apr. 16, 1942 |